(12) United States Patent
Rune et al.

(10) Patent No.: US 10,194,457 B2
(45) Date of Patent: Jan. 29, 2019

(54) METHOD AND DEVICE FOR PROACTIVE ALLOCATION OF UPLINK RESOURCES

(71) Applicant: Telefonaktiebolaget LM Ericsson (publ), Stockholm (SE)

(72) Inventors: Johan Rune, Lidingö (SE); Oleg Vasilenko, Odintsovo (RU); Ying Sun, Sundbyberg (SE); Anna Larmo, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 170 days.

(21) Appl. No.: 15/102,349

(22) PCT Filed: Dec. 17, 2013

(86) PCT No.: PCT/SE2013/051531
§ 371 (c)(1),
(2) Date: Jun. 7, 2016

(87) PCT Pub. No.: WO2015/094033
PCT Pub. Date: Jun. 25, 2015

(65) Prior Publication Data
US 2017/0019914 A1    Jan. 19, 2017

(51) Int. Cl.
*H04Q 7/00* (2006.01)
*H04W 72/12* (2009.01)
(Continued)

(52) U.S. Cl.
CPC ... *H04W 72/1268* (2013.01); *H04W 72/1284* (2013.01); *H04W 28/26* (2013.01); *H04W 72/14* (2013.01)

(58) Field of Classification Search
CPC ......... H04W 72/1268; H04W 72/1284; H04W 72/14; H04W 28/26
(Continued)

(56) References Cited

U.S. PATENT DOCUMENTS

2010/0124932 A1* 5/2010 Harada ................. H04L 1/1812
455/450
2011/0310833 A1 12/2011 Lee et al.
(Continued)

FOREIGN PATENT DOCUMENTS

WO  WO 2012/022369 A1  2/2012
WO  WO 2014/070049 A1  5/2014

OTHER PUBLICATIONS

International Search Report, Application No. PCT/SE2013/051531, dated Sep. 3, 2014.
(Continued)

*Primary Examiner* — Chuong T Ho
(74) *Attorney, Agent, or Firm* — Sage Patent Group

(57) ABSTRACT

Some embodiments related to a method for proactive allocation of uplink transmission resources to a wireless device, wherein the wireless device transmits periodic uplink data traffic. The method is performed in a radio access node in a wireless communication system. The method includes estimating a transmission phase for the periodic uplink data traffic by, for two or more transmission periods, adjusting the timing of an uplink transmission resource allocation for the wireless device in a subsequent transmission period depending on whether an uplink transmission resource allocated in a previous transmission period was used by the wireless device or not. The method further includes proactively allocating uplink transmission resources to the wireless device, such that the timing of the proactively allocated resources matches the estimated transmission phase.

15 Claims, 12 Drawing Sheets

(51) Int. Cl.
*H04W 28/26* (2009.01)
*H04W 72/14* (2009.01)

(58) Field of Classification Search
USPC .......................................... 370/329, 336, 330
See application file for complete search history.

(56) References Cited

U.S. PATENT DOCUMENTS

| | | | |
|---|---|---|---|
| 2012/0275421 | A1 | 11/2012 | Vukovic et al. |
| 2013/0230005 | A1* | 9/2013 | Dakshinamurthy ........................ H01Q 3/2647 370/329 |
| 2013/0294539 | A1* | 11/2013 | Howard ................ H04L 1/0003 375/273 |
| 2014/0153461 | A1* | 6/2014 | Lorenz .............. H04W 52/0245 370/311 |
| 2015/0245326 | A1* | 8/2015 | Rune .................... H04L 1/0003 370/329 |

OTHER PUBLICATIONS

Written Opinion of the International Searching Authority, Application No. PCT/SE2013/051531, dated Sep. 3, 2014.

* cited by examiner

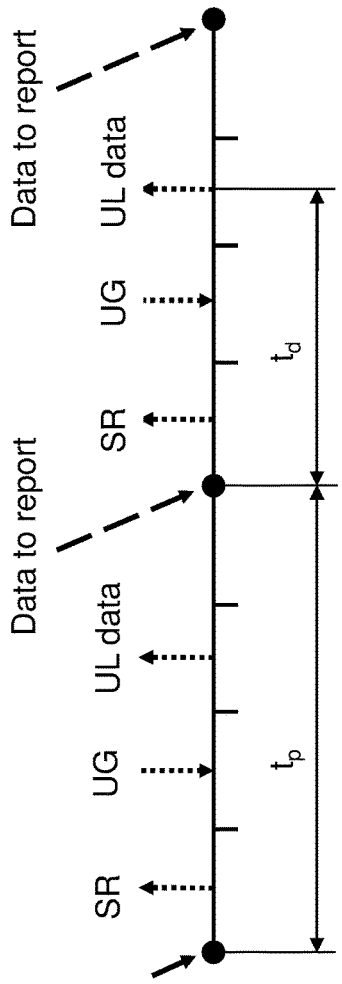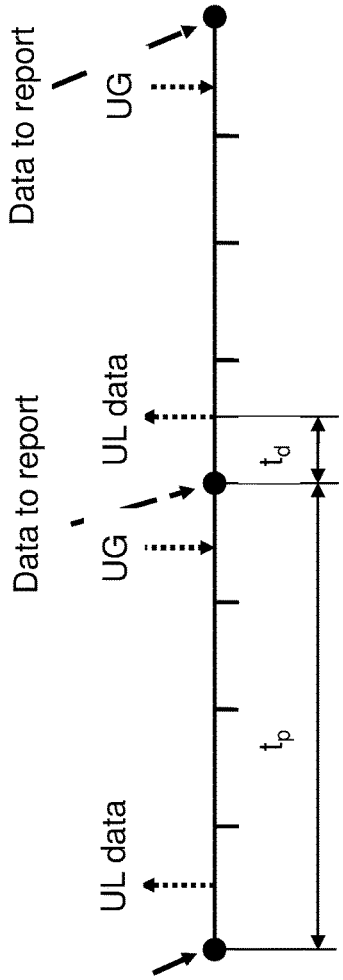
Figure 3a
Figure 3b

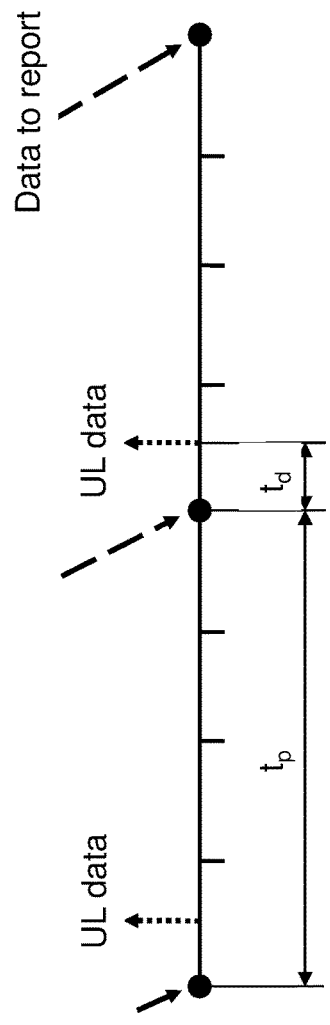
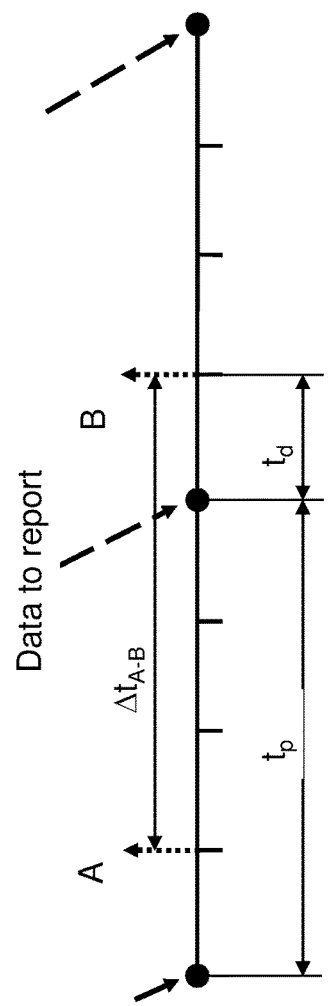
Figure 3c
Figure 4

METHOD AND DEVICE FOR PROACTIVE ALLOCATION OF UPLINK RESOURCES

CROSS REFERENCE TO RELATED APPLICATION

This application is a 35 U.S.C. § 371 national stage application of PCT International Application No. PCT/SE2013/051531, filed on Dec. 17, 2013, the disclosure and content of which is incorporated by reference herein in its entirety. The above-referenced PCT International Application was published in the English language as International Publication No. WO 2015/094033 A1 on Jun. 25, 2015.

TECHNICAL FIELD

The present invention relates generally to a method and a radio access node for proactive allocation of uplink transmission resources, and to a method and a wireless device for transmitting periodicity information to a radio access node.

BACKGROUND

In a currently popular vision of the future development of communication in cellular networks, huge numbers of (mostly) small autonomous devices become increasingly important. These devices are assumed not to be associated with humans, but are rather sensors or actuators of different kinds, which communicate with application servers (which configure the devices and receive data from them) within or outside the cellular network. Hence, this type of communication is often referred to as machine-to-machine (M2M) communication and the devices may be denoted machine devices. In the 3GPP standardization, the corresponding alternative terms are machine type communication (MTC) and machine type communication devices (MTC devices), with the latter being a subset of the more general term user equipment, UE. In terms of numbers MTC devices will dominate over human users, but since many of them will communicate very scarcely, their part of the traffic volume will be much smaller than their part of the "user" population.

With the nature of MTC devices and their assumed typical uses follow that they will often have to be very energy efficient, since external power supplies will often not be available and since it is neither practically nor economically feasible to frequently replace or recharge their batteries. For such energy deprived devices, the traffic is characterized by small, more or less infrequent transactions (often delay tolerant), which will result in a large signaling overhead. Hence, reducing the signaling overhead is an important means to facilitate for such devices to efficiently function, with a long battery lifetime, using a cellular network.

Machine devices, however, consist of a very heterogeneous flora of devices and applications. Although the above described energy deprived (e.g. sensor) devices may, according to the vision, constitute the largest part in terms of numbers, many other types of MTC devices and MTC applications are also envisioned or already existing. One area that has received quite a lot of attention is the development of power grids into what is denoted as "smart grids". This refers to the evolution of the conservative power grid technology into grids that are better adapted to the envisioned future requirements in the area of generation and distribution of electricity, involving intermittent generation sources such as wind and solar power plants, many small generation sources (such as customers which sometimes produce more electricity than they consume) and a desire to impact the customers energy consumption habits to even out load peaks. In this evolution information technology, in particular communication technology has an important role to play. In many smart grid applications entities in the power grid, so-called substations (e.g. transformer stations) communicate with each other and with a control center for the purpose of automation and protection of equipment when faults occur. In contrast to the above described energy deprived devices with delay tolerant scarce communication, these smart grid applications often have extremely strict latency requirements, the amount of data communicated may range between small and large and the energy supply is typically not a major issue. To make cellular communication technology a possible and attractive means of communication for such devices and applications, it is crucial to keep the delay associated with access and end-to-end communication as low as possible.

As the present disclosure is related to scheduling/allocation of mainly uplink transmission resources for wireless devices or mobile terminals (denoted user equipments, UEs in 3GPP systems), a brief description of how scheduling/allocation of uplink transmission resources is performed in LTE follows below.

The procedure leading to an uplink transmission of data on the Physical Uplink Shared Channel (PUSCH) comprises a request from the UE for uplink transmission resources, an allocation of uplink resources signaled from the eNB triggered by the request, and finally an uplink transmission of data from the UE. This procedure is illustrated in FIG. 2.

As illustrated in FIG. 2, the resource request from the UE is typically in the form of a scheduling request (SR) transmitted on Physical Uplink Control Channel (PUCCH) resources dedicated for the UE. The SR in itself contains no structure and no specific information other than that uplink transmission resources are requested. The PUCCH resources that are used for the SR transmission implicitly indicate which UE is requesting the transmission resources, since these PUCCH resources are dedicated for this UE. The scheduling algorithm in the eNB then selects suitable uplink transmission resources on the PUSCH to allocate to the UE, and signals the allocation to the UE using an uplink grant on the Physical Downlink Control channel (PDCCH). The uplink grant is addressed to the concerned UE by adding the dedicated Cell Radio Network Temporary Identifier (C-RNTI) of the UE to the Cyclic Redundancy Check (CRC) of the Downlink Control Information (DCI) containing the uplink grant. In other words, the C-RNTI is not explicitly included in the DCI. In the current release of LTE, the allocation always concerns resource blocks (which are indicated in the uplink grant) occurring four subframes later than the uplink grant. However, other releases or other systems may of course apply a different time interval between the uplink grant and the allocated resources. The last step is that the UE transmits buffered uplink data, i.e. uplink data waiting for transmission, using the allocated uplink resources on the PUSCH.

In addition to the above described regular one-time allocation of transmission resources there is a special form of allocation of repetitive transmission resources denoted semi-persistent scheduling (SPS). SPS may be configured in advance for a UE through RRC signaling. In practice, configuration may be performed through the SPS-Config IE in the radioResourceConfigDedicated IE using the RRCConnectionSetup message or an RRCConnectionReconfiguration message. The SPS configuration mainly consists of allocation of a UE-specific SPS-C-RNTI and a repetition interval (for either or both of uplink and downlink as applicable) for the resources to be allocated through SPS. The actual allocation of the repetitive SPS resources is communicated in an uplink grant, with the contents of a one-time allocation, but addressed to the SPS-C-RNTI of the concerned UE. The repetitive resources allocated through SPS may be explicitly released through PDCCH signaling in the form of another uplink grant addressed to the same SPS-C-RNTI with dummy parameter values to indicate 'SPS release'. This is typically done if a Buffer Status Report (BSR) indicating an empty buffer is sent for a configurable number (e.g. 2 or 3) of consecutive uplink transmissions.

Another way to request PUSCH transmission resources is that the UE transmits a Buffer Status Report (BSR) indicating a non-empty transmission buffer. A BSR is conveyed in the form of a MAC Control Element, typically transferred to the eNB in conjunction with a user data transmission, wherein the MAC Control Element containing the BSR is a part of the MAC PDU that carries the user data.

In addition to the above described procedures for request and allocation of transmission resources, uplink transmission resources may be allocated using the Random Access Response message during the random access procedure, thus making a random access preamble transmission effectively work as a request for transmission resources.

Uplink transmission resources, whether allocated via SPS or using regular one-time allocation, are allocated as one or more chunks of the OFDM time-frequency grid, denoted resource blocks. A resource block consists of 12 subcarriers of 15 kHz each in the frequency domain and a slot of length 0.5 ms in the time domain. Pairs of slots are further grouped together to form 1 ms subframes. Each slot consists of 7 resource elements (or 6 if an extended cyclic prefix is used), each containing an OFDM symbol including cyclic prefix. Hence, each resource block consists of 84 resource elements (or 72 if the extended cyclic prefix is used). Scheduling in LTE is performed on a subframe basis, i.e. in each subframe the available bandwidth may be allocated to one or more UEs. In the frequency domain the allocations have to adhere to resource block boundaries, as mentioned above. The smallest possible allocation is thus two resource blocks, one in each slot of a subframe. When data is transmitted using the allocated resources, the modulation and coding scheme and transport format are chosen such that they match the size of the allocated resources, and the bits to be transmitted are mapped to the resource elements (and OFDM symbols) of the allocated resource. In order to enable coherent detection at the receiver (e.g. an eNodeB), a transmitting UE includes a cell specific Demodulation Reference Signal (DMRS) time-interleaved with the data. Specifically, the DMRS is transmitted in the fourth (or third if an extended cyclic prefix is used) OFDM symbol of each slot, i.e. twice every subframe, across the entire allocated transmission resource, i.e. on all subcarriers of the allocated resource blocks. From 3GPP release 11, a DMRS may be made UE specific based on a combination of DMRS sequence and phase rotation of the sequence.

US 2012/0275421 A1 discloses a technique for reducing a time delay between an application output at a subscriber station and uplink resource allocation for the subscriber station. The technique includes scheduling one or more probe uplink resource allocations for the subscriber station, and scheduling subsequent periodic uplink resource allocations based on at least one of the probe uplink resource allocations.

There is still a need in the art for improved mechanisms for allocating uplink transmission resources to wireless devices that are transmitting periodic uplink data traffic.

SUMMARY

An object of some embodiments is to provide a resource-efficient mechanism for reducing time delay when allocating uplink transmission resources to wireless devices that are transmitting periodic uplink data traffic. In particular, it is an object to reduce delay while keeping the signalling overhead low, compared to prior art methods.

Some embodiments provide a method for proactive allocation of uplink transmission resources to a wireless device, which transmits periodic uplink data traffic. The method is performed in a radio access node in a wireless communication system. According to the method, the wireless device .estimates a transmission phase for the periodic uplink data traffic by, for two or more transmission periods, adjusting the timing of an uplink transmission resource allocation for the wireless device in a subsequent transmission period depending on whether an uplink transmission resource allocated in a previous transmission period was used by the wireless device or not. Further, the wireless device proactively allocates uplink transmission resources to the wireless device, such that the timing of the proactively allocated resources matches the estimated transmission phase.

Other embodiments provide a radio access node comprising a processor and a memory. The memory contains instructions executable by the processor whereby the radio access node is operative to estimate a transmission phase for periodic uplink data traffic received from a wireless device by, for two or more transmission periods, adjusting the timing of an uplink transmission resource allocation for the wireless device in a subsequent transmission period depending on whether an uplink transmission resource allocated in a previous transmission period was used by the wireless device or not. The radio access node further is operative to proactively allocate uplink transmission resources to the wireless device, such that the timing of the proactively allocated resources matches the estimated transmission phase.

Yet further embodiments provide a method in a wireless device configured for periodic uplink data traffic. The method comprises determining a periodicity for the periodic uplink data traffic, and transmitting information about the periodicity to a radio access node.

Some embodiments provide a wireless device comprising a processor, a memory, and a transmitter. The memory contains instructions executable by the processor whereby the wireless device is operative to determine a periodicity for the periodic data traffic, and transmit information about the periodicity via the transmitter to a radio access node.

Some embodiments enable reduced access delay, and thus end-to-end delay, for applications using periodic transmissions, which is particularly useful for certain MTC applications. This may be achieved by estimating the transmission phase of the periodic data traffic in an iterative manner using only a single resource allocation or a pair of allocations in each transmission period, and then proactively allocating transmission resources matching the estimated phase. In this way the timing of the proactive allocation is aligned to the incoming data, reducing delay. At the same time, the iterative method requires only a small amount of additional signaling overhead.

Some embodiments thus provide automatic synchronization with the transmission schedule of the UE through observations and probing resource allocations, i.e. self-learning. In addition, by eliminating the need for scheduling requests and, when SPS is used, the need for transmission resource allocations, some embodiments disclosed herein also reduce the energy consumption in the UE and save further signaling resources.

BRIEF DESCRIPTION OF THE DRAWINGS

FIG. 3a-c show the periodic UE buffer refill and data transmission processes.

FIG. 4 is a schematic diagram illustrating a resource allocation pair according to some embodiment.

Figure 1:
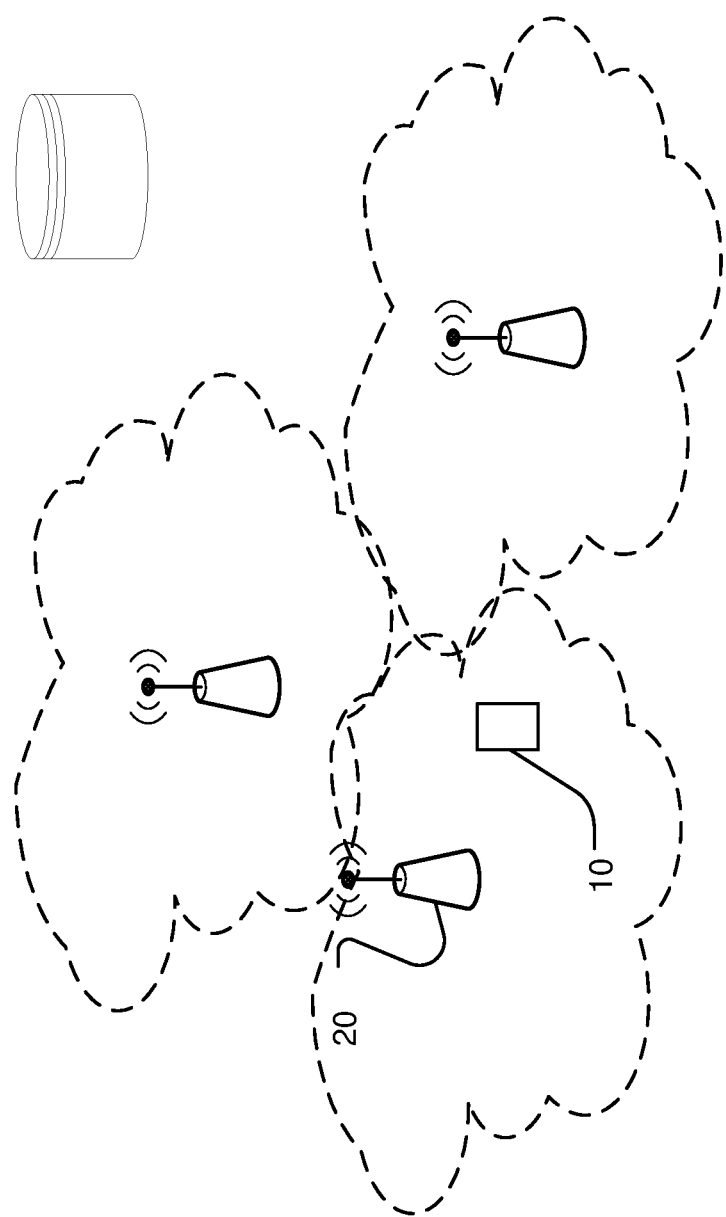
FIG. 1 is a schematic diagram illustrating a communications network.

ABBREVIATIONS 3G 3$^{rd}$ generation
3GPP 3$^{rd}$ Generation Partnership Project
BSR Buffer Status Report
CRC Cyclic Redundancy Check
C-RNTI Cell Radio Network Temporary Identifier
DCI Downlink Control Information
DMRS Demodulation Reference Signal
DPI Deep Packet Inspection
eNB eNodeB
eNodeB E-UTRAN NodeB/Evolved NodeB
EPS Evolved Packet System
E-RAB E-UTRAN Radio Access Bearer
E-UTRAN Evolved UTRAN
GPRS General Packet Radio Service
GTPv2-C The control plane part of version 2 of the GPRS Tunneling Protocol.
HSPA High Speed Packet Access
HSS Home Subscriber Server
IE Information Element
kHz kilohertz
LTE Long Term Evolution
M2M Machine-to-Machine
MAC Medium Access Control
MCS Modulation and Coding Scheme
MME Mobility Management Entity
MS millisecond
MTC Machine Type Communication
OFDM Orthogonal Frequency Division Multiplex
PCRF Policy and Charging Rules Function
PDCCH Physical Downlink Control Channel
PDN Packet Data Network
PDU Packet Data Unit
PGW PDN Gateway
PUCCH Physical Uplink Control Channel
PUSCH Physical Uplink Shared Channel
QCI QoS Class Identifier
QoS Quality of Service
RBS Radio Base Station
RNC Radio Network Controller
RRC Radio Resource Control
S1 The interface between the radio access network and the core network in EPS.
S1AP S1 Application Protocol (a protocol used between an eNB and an MME)
SCS Services Capability Server
SGi The interface between the EPS core network (represented by the PGW) and an external Packet Data Network, e.g. the Internet or a corporate network.
SGW Serving Gateway
SPS Semi-Persistent Scheduling
SR Scheduling Request
UE User Equipment
UL Uplink
UMTS Universal Mobile Telecommunications System
UTRAN Universal Terrestrial Radio Access Network
VoLTE Voice over LTE
WCDMA Wideband Code Division Multiple Access

DETAILED DESCRIPTION

Various examples here are described in terms of EPS/LTE. However, it should be noted that these concepts are applicable also to UMTS/WCDMA/HSPA. In EPS/LTE, some embodiments are performed mainly or completely in the base station, i.e. the eNB, where the scheduling is performed. In UMTS/WCDMA/HSPA the corresponding node(s) would be the RNC (which is in charge of the scheduling of regular WCDMA 3G) and/or the Node B (which is responsible for the scheduling of HSPA).

Note also that although the present disclosure primarily targets MTC devices, the solutions presented herein may be used in conjunction with any type of UE, or wireless device in general. Within the context of this disclosure, a "wireless device" may be any device intended for accessing services via an access network and configured to communicate wirelessly over the access network. For instance, the wireless device may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or PC. In particular examples, the wireless device may be a device configured to connect to an M2M service provider over the access network. The wireless device may be a portable, pocket-storable, hand-held, computer-comprised, or vehicle-mounted mobile device, enabled to communicate voice and/or data, via a wireless connection. The wireless device may also be associated with utility equipment, such as smart grid equipment, e.g. located in an electricity grid substation.

Various embodiments disclosed herein refer to a "user equipment" or "UE" to illustrate an example of a wireless device. The terms "user equipment" or "UE" should not be construed as limiting, but it should be understood that the same principles apply also to other wireless devices, e.g. any of the devices listed above.

Further, when this disclosure refers to a "radio access node", this should be understood as encompassing any node that is capable of providing wireless devices with access to a wireless communication system, e.g. LTE or UMTS. Hence, non-limiting examples of a radio access node are a radio base station (RBS), an LTE eNodeB or a UMTS or HSPA NodeB. A radio access node may also be referred to as a "wireless access point", or more generally as an "access point". Moreover, when examples here refer specifically to an RBS or eNodeB, it should be understood that this is done for illustrative purposes and should not be construed as limiting these examples to these specific types of radio access nodes. The same principles apply to radio access nodes in general. One example of another type of radio access node to which various embodiments may apply is a Radio Network Controller (RNC) in a UMTS/WCDMA/HSPA network, which is a radio access node responsible for, among other things, radio resource control and scheduling tasks and thus relevant as a target for realization of the present invention.

Figure 2:
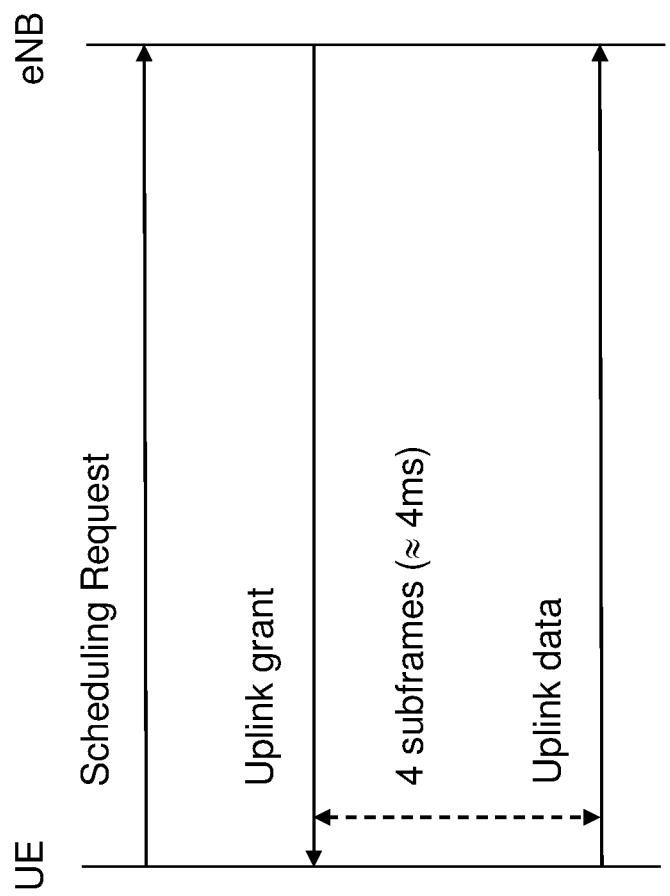
FIG. 2 is a signalling diagram illustrating uplink scheduling in LTE.

The uplink transmission scheduling procedure shown in FIG. 2 is problematic in three ways, involving two different aspects of the MTC device flora and one system capacity aspect:

It incurs a delay when accessing uplink transmission resources. This adds to the end-to-end delay, which is crucial to keep short, e.g. for mission critical smart grid applications.

It incurs energy consumption in the UE, which is crucial to keep as low as possible for many MTC applications. Energy is consumed in the UE both when the UE transmits a scheduling request and when it monitors, receives and decodes PDCCH transmissions in anticipation of an uplink grant.

Ubiquitous deployment of MTC devices frequently generating small chunks of data strains the control plane (i.e. signaling) capacity of the cell.

As mentioned above, some MTC applications depend heavily on achieving very short access delays. There is thus a need for methods of reducing the access delay, and thus end to end delay, in conjunction with (especially UL) transmission. Some embodiments presented herein simultaneously achieve access signaling reduction, which relieves the strain on the control plane resources in the cell and conserves energy in the UE.

One way to shorten the uplink scheduling and transmission resource allocation procedure, i.e. the access delay, corresponding to the time period $t_p$ in FIG. 3a, is to proactively schedule the UE for uplink transmission without receiving a preceding request for transmission resources from the UE. That is, the eNB would send an unsolicited uplink grant to the UE.

In many applications there is a process on the client side that periodically generates and pushes data packets to the UE transmission buffer. These cases are particularly interesting for access delay reduction through proactive resource allocation. FIG. 3b) shows an example of proactive resource allocation. In this case the UL latency can be significantly decreased if the UE has periodical transmission opportunities at time instances 1-2 ms after the packets enter the UE buffer. Note that the uplink grant (UG) in FIG. 3b) is transmitted before the data is actually available in the UE (arrow labeled "Data to report"). Hence, the delay $t_d$ before the UL data is transmitted can be reduced.

The synchronization of the data stream of the UE and the transmission granting processes may be done in four dimensions:
transmission periodicity,
transmission phase,
packet size,
suitable MCS and subcarrier frequencies.

If the network does not know one or more of the above dimensions beforehand, it may be possible to learn them e.g. by monitoring transmissions from the UE.

Several embodiments that will now be described below focus on determining the transmission phase, thereby enabling reducing delay by providing a proactive resource allocation to the wireless device "at the right moment", i.e. aligned with the transmission phase.

The term "transmission phase", as used in the present disclosure, refers to the periodically recurring point in time when new periodic data is available for transmission in the wireless device.

It will assumed that the transmission periodicity for the wireless device, as well as other parameters such as packet size, are already known to the radio access node. As will be further explained below, the periodicity information may be signaled directly, or it may be learnt in several different ways.

Tracking of the phase of the packet arrival process is a trickier task. FIG. 4 illustrates the case when a UE (whose packet arrival period tp is known) is granted two transmission opportunities at time instants A and B and B—A is smaller than the packet arrival periodicity. Each transmission opportunity should grant enough resource capacity to transmit an entire packet. If the UE uses option A to transmit data, then the packet came to the UE buffer sometime before A. If the UE uses option B, we conclude that packet entered the UE buffer during time interval between A and B. The closer moment B stands to moment A, the higher accuracy of the transmission phase estimation can be achieved. Thus, to find the phase we may move the A-B resource allocation pair earlier for each transmission period until the UE chooses option B. From thereon we may optionally move B closer and closer to A in order to achieve an even more accurate phase tracking.

Figure 5:
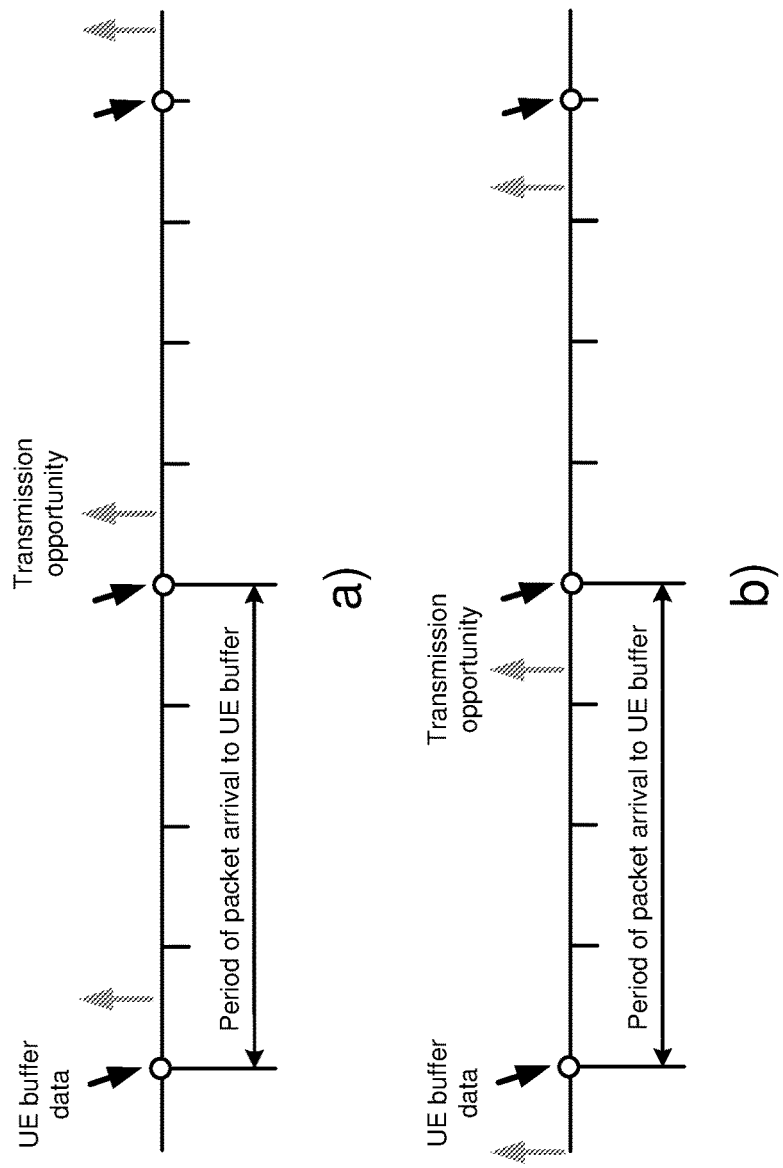
FIG. 5 is a schematic diagram illustrating packet arrivals and transmission opportunities.

Another phenomenon, that can be used to estimate the packet arrival phase, is one-time increase in the inter-packet delivery time interval in case a transmission opportunity time slips behind the moment when a next packet arrives into the UE buffer. In this situation the UE cannot send the packet immediately and needs to wait almost one period to transmit the data. FIG. 5 shows the periodic UE buffer refill and data transmission processes when minimum transmission latency (a) and after a transmission opportunity phase slip (b).

If the RBS (eNB) knows the parameters of periodic data arrival to the UE buffer, it can use proactive allocations by means of the regular one-time UL grants (UG) or SPS to provide periodic data transmission opportunities at the right moments. Shifting the phase of SPS may be done with an UG (addressed to the SPS-C-RNTI) overriding the previous one.

A more comprehensive scheme for tracking both period and/or phase of periodic transmissions could use periodic proactive resource allocations with a mixture of longer and shorter periods.

The RBS first awaits an initial transmission from the UE. Transmission resources for this initial transmission may be allocated through a regular SR-UG exchange or using periodic proactively allocated resources with a long period (where "long" still can be rather short, e.g. 10 ms or 20 ms). When an initial UL transmission is detected, it triggers the periodic proactive resource allocations with a short period, e.g. 1 ms (i.e. every subframe). The purpose of the short periodic allocations is to detect the phase of the packet arrivals to the UE buffer or both the phase and period (if the packet arrival period was not known in advance).

If the packet arrival period is known in advance, then only the second transmission (i.e. the first transmission is the triggering one serviced by the long period proactive resource allocation or the regular SR-UG exchange) by means of short period proactive resource allocations is needed to pin down the phase at the accuracy of the short allocation period, i.e. preferably 1 ms.

If desired, sub-millisecond accuracy may also be achieved by keeping the short period (1 ms) allocations over several transmission periods and averaging the "measurements" over these periods. To illustrate how sub-millisecond accuracy may be achieved through averaging, let's assume the period of packet arrivals to the UE buffer is not an exact multiple of milliseconds. Then, over a period of time, the transmissions will "slip" (forward or backward) periodically, because of the mismatch with the allocation period, which is a multiple of milliseconds. These slips give the RBS a chance to calculate the period of packet arrivals to the UE buffer with sub-millisecond accuracy through averaging over many transmission samples. And once the period is accurately known, the RBS will know how much the (ideal) packet arrival time actually drifts (denoted $\delta$ in the sequel) every SPS period (although individual sub-millisecond slips will not be visible until they have accumulated enough drift time to cause a slip to an earlier or later subframe). Then, looking at a slip instance, the RBS knows that the maximum difference between the time of packet arrival to the UE buffer and the subframe where the SPS transmission occurred is $\pm\delta$. Since $\delta$ may be much less than a millisecond, this gives us both the period and the phase with sub-millisecond accuracy. Note that if the packet arrival period is an exact multiple of milliseconds, then looking over a longer period of time will not give us additional information on the phase (only on the period).

If both the phase and period are unknown, then two additional transmissions (i.e. one triggering transmission followed by two transmissions using short period allocations) are needed to determine both the period and phase of the packet arrival process (and again an option could be to use several transmission periods to get average values with sub-millisecond accuracy). When both period and phase are known, the short period proactive allocations are stopped and the long period proactive allocations are adapted according to the detected period and phase in order to allow transmissions with very short access delay.

Since the accuracy of such "measurements" will not be perfect, subsequent adjustments of the proactive allocations may be advantageous to perform. Such adjustments may be triggered by a "slip" (a zero transmission), indicating that the proactive allocations occur (e.g. one subframe) too early. However, cases when the proactive allocations occur too late will not cause any slips and have to be detected some other way. In such cases the UE will eventually send a scheduling request (because it has data to send without a valid UG). Exactly how late the proactive allocation has to be to cause this UE behavior is probably implementation dependent, since it depends on how fast the UE can prepare UL data for transmission. Hence, it will be difficult to use scheduling requests to get a really accurate indication of exactly what subframe that is ideal for the proactive allocation. A possible scheme could be to gradually push it earlier and earlier until you detect a slip (which indicates that eventually the proactive allocation was too early).

An alternative to the above described schemes for subsequent adjustments could be to every now and then use a sequence of short period proactive allocations to "refresh" the RBS with accurate period and/or phase measurements.

SPS could beneficially be used for the long period proactive allocations. This is more resource efficient than using regular dynamic UGs. Adaptation of the phase may be achieved with an activating UG overriding the previous one, but if the period needs to be adjusted, then a new SPS has to be configured using an RRCConnectionReconfiguration message (which is thus slower and more resource demanding but still rather simple). To simplify this procedure, a mechanism for adapting the phase and/or period of an existing SPS configuration could be introduced. One way to achieve this is to introduce a new MAC Control Element.

Note that unless the period of packet arrival to the UE UL buffer is an exact multiple of milliseconds, the phase of the packet arrival process will repeatedly slip in relation to the SPS subframe structure, which decreases the benefits of using SPS. If sub-millisecond accuracy has been achieved (as described above), the RBS may use this knowledge to anticipate the slips and proactively allocate resources earlier or later according to the expected drift of the phase of the transmission period. If SPS is used, then such adjustments can be made using an overriding UG (since only the phase—not the period—is affected). The frequency of the periodic slips depends on how much the packet arrival period T deviates from a multiple of milliseconds (denoted D), i.e. D=MIN(R, S−R) ms, with R=T modulo[1] S ms, where S is the time length of a subframe, i.e. 1 ms, and MIN is an operator returning the smallest of its inputs. The periodicity of the slips, $P_{slip}$, may then be calculated as $P_{slip}$=(S/D)× T. In the worst case D=S/2=0.5 ms, which means that a slip will occur every second packet arrival event, thus requiring a phase adjusting overriding UG for every second packet arrival. However, even in this worst case scenario SPS is more efficient than regular UGs, since with regular UGs an UG has to be transmitted for every new packet coming to the UE buffer.

[1] Note that although the use of the modulo operator in this manner is not strictly correct (since it is defined for integer arithmetic), it is a convenient way of illustrating the principle. Another, stricter way of expressing the same entity is R=T−INT(T/S)×S ms (where INT is an operator that truncates a floating point number to the nearest smaller integer).

SPS may be used also for the short period proactive allocations, but since these allocations will be performed as rather infrequent and relatively short "bursts" of periodic allocations, the benefits of using SPS are smaller in this case. In addition, using SPS for both the long and the short period proactive allocations would increase the complexity. Changing between the long and the short period would require an RRCConnectionReconfiguration procedure, followed by an activation of the new configuration. This operation may introduce an undesirably long delay, which may cause a glitch in the periodic transmissions when the long period is not long enough to accommodate this reconfiguration procedure. To overcome this issue and smoothen out the transitions between long and short period proactive allocations (for the cases when it may occur), additional measures could be introduced, such as:

"filling out" missed SPS resource allocations using regular UGs;
introducing a MAC Control Element for fast changing of period and/or phase of an existing SPS configuration;
allowing two (or more) SPS configurations to exist and potentially be active for the same UE simultaneously;
allowing two (or more) SPS configurations for the same UE, but with only one of them active at a time, introducing a swift way of changing between the configurations, using e.g.
a MAC Control Element,
an UG with a new indication in the DCI, or
an RRCConnectionReconfiguration message;

using regular UGs for the short period proactive allocations;

omitting the (optional) initial long period proactive allocations and relying on the UE to transmit a scheduling request for the initial triggering transmission (note that this does not solve the problem for subsequent sequences of short period proactive allocations).

Considering the small benefits of using SPS for the short period proactive allocations, it may be preferable to use regular UGs for the short period proactive allocations.

Tracking and applying suitable MCS and subcarrier frequencies may be somewhat tricky since these properties often have a very dynamic nature. For static devices, e.g. deployed in utility facilities where also the surrounding environment is rather stable, it may be possible for the radio access node to at least get a rough idea of the appropriate MCS and subcarrier frequencies based on previous transmissions. However, even static devices may have significant variations in the channel quality, so it is uncertain how accurate these estimates can be. An option could be to configure the wireless device to transmit sounding reference signals (SRS), e.g. with the same periodicity as the periodic user data transmissions. An SRS transmission a few milliseconds before each resource allocation should allow the access point to choose appropriate subcarriers and an appropriate MCS to indicate in an UG. This method may be used with both regular UGs and SPS (using overriding UGs to change the MCS and/or subcarriers), but if the MCS and/or subcarriers are changed significantly more or less for every allocation, then SPS would not be very useful. To keep the UGs infrequent in conjunction with SPS the RBS may choose a robust MCS and have a conservative strategy when determining to change the subcarriers and/or MCS of the semi-persistently allocated resources. Yet a way to deal with variable MCS in conjunction with SPS could be to introduce a means for activating multiple parallel MCS for the same SPS configuration, allowing the UE to choose from time to time.

FIG. 1 illustrates an example wireless communications system where various embodiments may operate. The system comprises several radio access nodes, e.g. radio access node 20. The coverage area of each radio access node is indicated schematically by a dashed line. The wireless communications system may, in some examples, be an LTE system. In that case, the radio access nodes are LTE eNodeBs, and the wireless device 10 is a user equipment, UE. However, as already mentioned above, references to LTE should not be construed as limiting, as the concepts presented here apply to other communications systems as well.

Figures 6, 7:
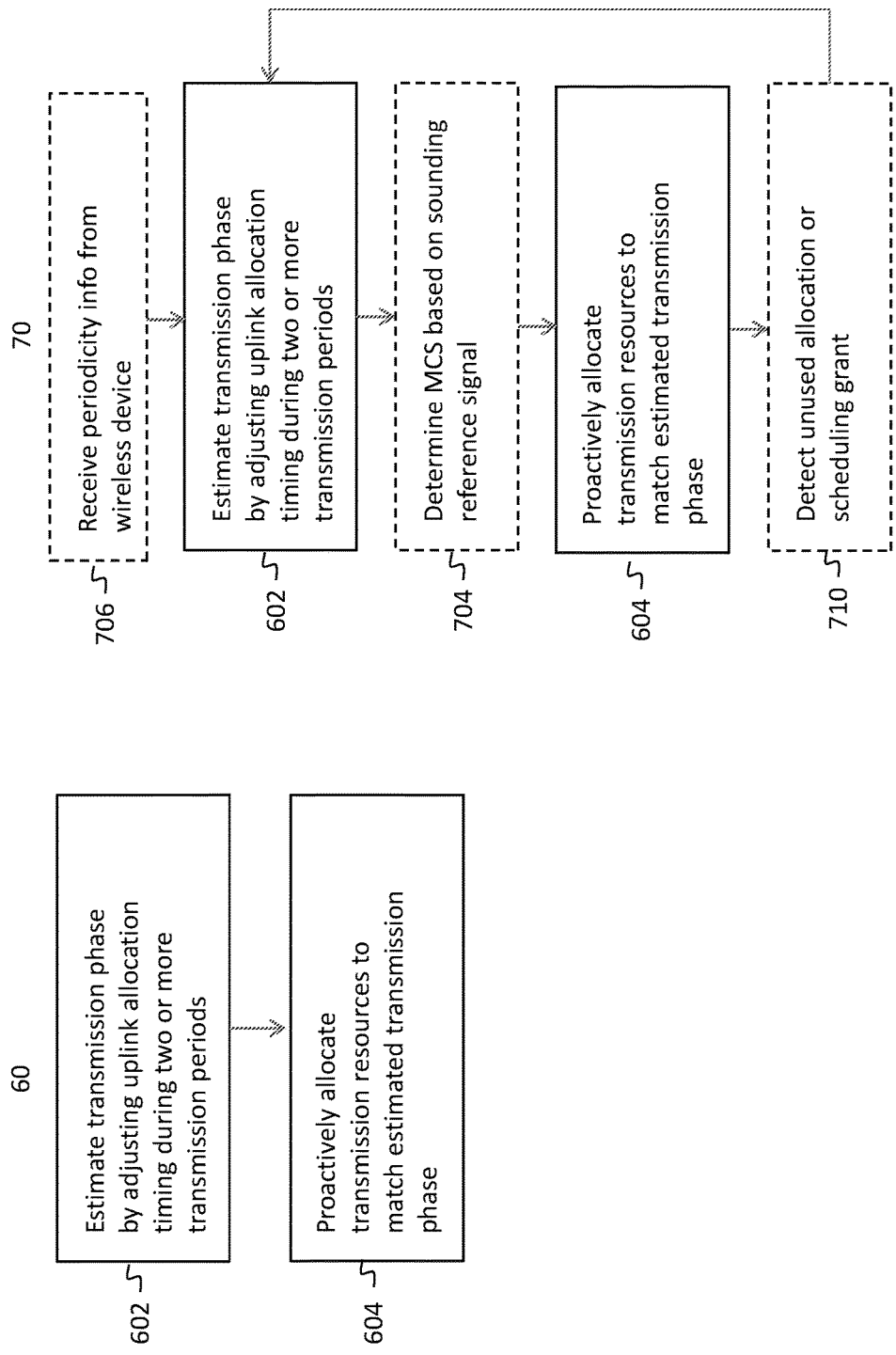
FIGS. 6-8 are flow charts illustrating methods according to various embodiments.

With reference to the flowchart in FIG. 6 and the scenario in FIG. 1, a method 60 will now be described for proactive allocation of uplink transmission resources to a wireless device 10. The method 60 is performed in a wireless access node 20 in a wireless communication system, such as the system shown in FIG. 1. The wireless device 10 transmits periodic uplink data traffic. The periodicity of this traffic is assumed to be known in the following example. Ways of obtaining or determining the periodicity information will be described in more detail below. In one variant of this embodiment, the wireless access node 20 receives 706 information about the periodicity of the uplink data traffic from the wireless device, before the start of the estimation 602.

According to the method 60, the wireless access node 20 estimates 602 a transmission phase for the periodic uplink data traffic. This is achieved by, for two or more transmission periods, adjusting the timing of an uplink transmission resource allocation for the wireless device in a subsequent transmission period depending on whether an uplink transmission resource allocated in a previous transmission period was used by the wireless device or not.

It should be noted that "subsequent" in this context means "subsequent to the previous transmission period". Hence, the previous and subsequent transmission periods may be two consecutive transmission periods. The previous and subsequent transmission periods could equivalently be referred to as "first" and "second" transmission periods.

A "transmission period", as referred to throughout this disclosure, is a time window with a size corresponding to the periodicity of the data traffic. In other words, the transmission phase lies somewhere within the transmission period.

In other words, the estimation 602 is an iterative process where, in each subsequent transmission period, the timing of a resource allocation is adjusted such that the estimated phase is increasingly accurate. Stated differently, in each subsequent transmission period a resource allocation is moved (i.e. the timing of the allocation is adjusted) closer to the actual transmission phase.

Throughout this disclosure, the "timing" of the resource allocation refers to the time when the resource is available for use by the wireless device (as opposed to the time when the resource allocation is transmitted, e.g. the time when the radio access node 20 transmits an uplink grant).

The estimation process may optionally be initiated e.g. by receiving a scheduling request from the wireless device 10. The radio access node 20 may interpret the scheduling request as the start of transmission of periodic data traffic from the wireless device 10, for which it would be advantageous to allocate resources proactively.

In order to align the timing of the proactive allocations with the phase of the periodic data traffic, the radio access node 20 estimates the transmission phase using the iterative procedure described above.

As an initial estimation (to start the iterative estimation process), the radio access node 20 may for example assume that the transmission phase corresponds to the time when the scheduling request was transmitted from the wireless device 10.

Uplink transmission resources are then allocated during two or more transmission periods. Based on whether an allocation is used by the wireless device or not, the radio access node 20 is able to determine whether the actual transmission phase lies before or after the allocation, and is hence able to improve the estimate for the next iteration by allocating an uplink resource with a timing that is adjusted accordingly. More specifically, if a certain allocation was not used, the radio access node can infer that the wireless device had no data to transmit at that point in time, and therefore the transmission phase is after that allocation. Conversely, if an allocation was used, the correct phase is some time before that allocation.

It should be appreciated that when the present disclosure refers to "adjusting the timing", this refers to the relative timing of the next allocated resource with respect to the start of a transmission period, or with respect to the timing of the previously allocated corresponding resource in the preceding transmission period.

The method further comprises proactively allocating 604 uplink transmission resources to the wireless device 10, such that the timing of the proactively allocated resources matches the estimated transmission phase. Hence, at a certain point in time the radio access node 20 determines that the estimate is accurate enough, and proceeds to proactively allocate resources. The timing of the proactive allocation should at this point be matched with the transmission phase, i.e. the proactive allocation should occur simultaneously with, or shortly after, new data is available for transmission in the wireless device 10. For example, the estimation could be stopped after a predetermined number of iterations have been performed, or when the radio access node 20 determines that the estimation error is below a threshold value.

This iterative method allows for accurate estimation of the phase without incurring a large amount of signaling overhead. Because the timing of the allocation is gradually adjusted during a number of transmission periods, it is possible to use only one or two allocations in each transmission period. This is more resource-efficient than prior art methods that use a one-time transmission of a large number of "probe" allocations, and estimate the phase depending on which of the probes is used.

Optionally (shown in FIG. 7), the radio access node also determines 704 a modulation and coding scheme to be used by the wireless device when transmitting on the proactively allocated resources, and transmits an indication of the determined modulation and coding scheme to the wireless device. The determination may be based on a sounding reference signal received from the wireless device.

As a further option (also shown in FIG. 7), the estimation 602 of the transmission phase and the proactive allocation 604 may be repeated when the radio access nodes detects 710 either non-use of the proactively scheduled transmission resource (i.e. a "slip" as described above), or a scheduling request from the wireless device. Both of these events are an indication that the proactive allocation needs to be readjusted, as described above.

Figures 8, 9:
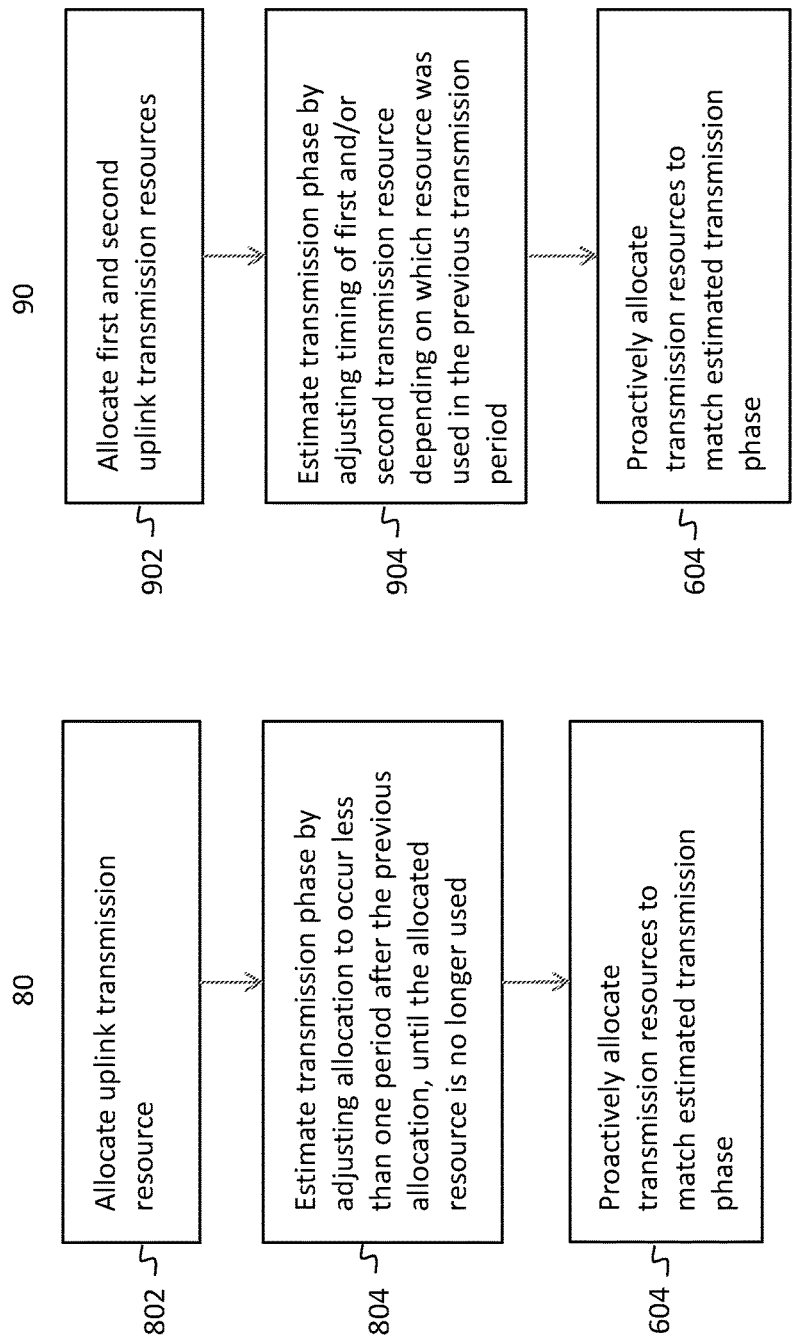
FIG. 9 is a flow chart illustrating a method according to an embodiment.

Another embodiment will now be described with reference to the flowchart in FIG. 8 and the scenario in FIG. 1. This embodiment provides a method 80 for proactive allocation of uplink transmission resources to a wireless device 10, wherein the wireless device 10 transmits periodic uplink data traffic. The method is performed in a radio access node 20 in a wireless communication system, such as the system shown in FIG. 1.

According to the method 80, a single uplink transmission resource is allocated 802 in each transmission period and the transmission phase is estimated 804 by adjusting the timing of the uplink transmission resource in a subsequent transmission period depending on whether the allocated resource in the previous transmission period was used or not.

If the uplink transmission resource in the previous transmission period was used by the wireless device (i.e. the wireless device transmitted data using the allocated resource), this implies that the phase lies somewhere before the timing of the previous allocation. Hence, the timing of the uplink transmission resource is moved "earlier in time" in the subsequent transmission period—that is to say, "earlier" relative to the start of the transmission period. Stated differently, the uplink transmission resource in the subsequent transmission period is allocated such that it occurs less than a transmission period length after the previous uplink transmission resource, i.e. the uplink transmission resource that was used by the wireless device.

The subsequent adjustments are performed until a transmission period occurs when the allocated uplink transmission resource is not used by the wireless device. The transmission phase may then be estimated to be somewhere between the timing of the uplink transmission resource that was not used, and the timing of the used uplink transmission resource in the previous transmission phase (where the "timing" is relative to the start of a transmission period).

The radio access node then proactively allocates 604 uplink transmission resources to the wireless device, such that the timing of the proactively allocated resources matches the estimated transmission phase, in a similar way as described in connection with method 70 above.

A further embodiment will now be described with reference to the flowchart in FIG. 9 and the scenario in FIG. 1. In this embodiment, a resource allocation pair is allocated in each transmission period.

This embodiment provides a method 90 for proactive allocation of uplink transmission resources to a wireless device 10, wherein the wireless device 10 transmits periodic uplink data traffic. The method 90 is performed in a radio access node 20 in a wireless communication system, such as the system shown in FIG. 1.

According to the method 90, a first and second uplink transmission resource is allocated 902 in each transmission period. The timing of the first uplink transmission resource is assumed to be before the timing of the second uplink transmission resource in the following description.

Figure 10:
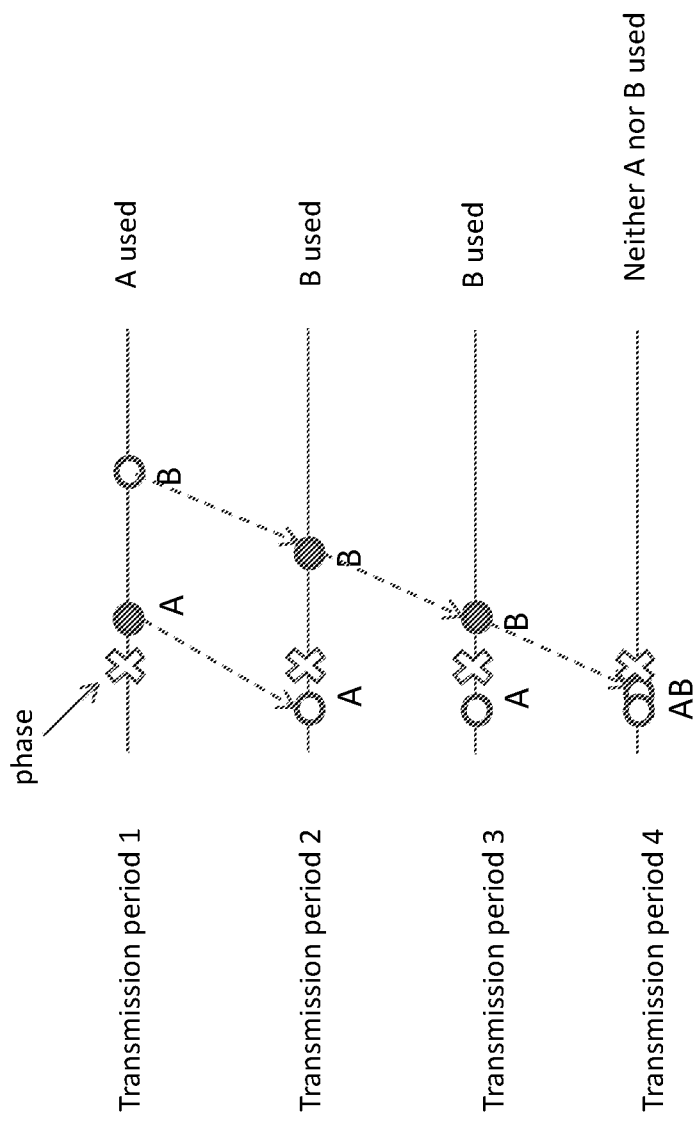
FIG. 10 is a schematic drawing illustrating timing adjustments according to an embodiment.
Figure 11:
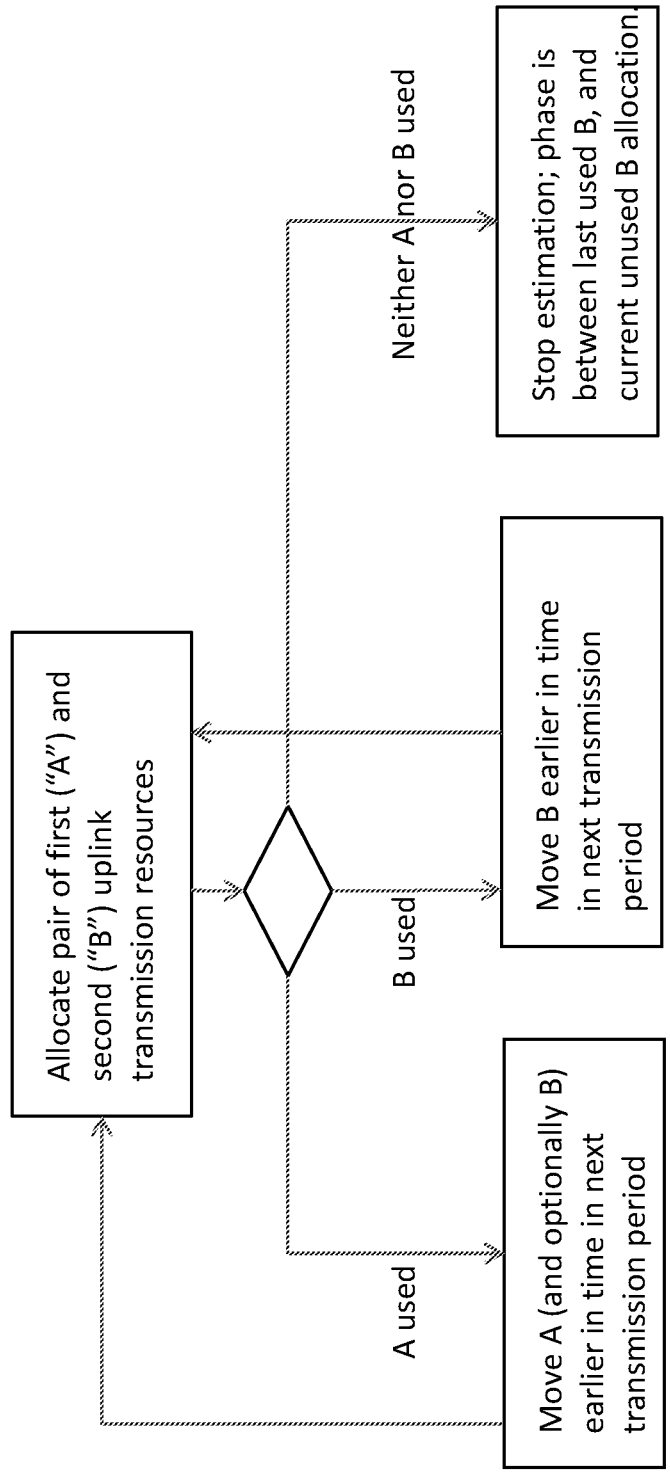
FIG. 11 is a flow chart illustrating an embodiment in more detail.

FIG. 10 schematically illustrates the method, and FIG. 11 provides a more detailed flowchart. In FIGS. 10 and 11, the first resource allocation is denoted "A" and the second resource allocation is denoted "B".

The transmission period is estimated 904 by, for two or more transmission periods, adjusting the timing of the first and/or the second resource allocations in a subsequent transmission period depending on which of the uplink transmission resources allocated in the previous transmission period was used by the wireless device. The adjusting may be done as follows.

When the first transmission resource was used in the previous transmission period (arrow "A used" in FIG. 11, and transmission period 1 in FIG. 10), allocate the first uplink transmission resource in the subsequent transmission period such that it occurs less than a transmission period length after the corresponding uplink transmission resource allocated in the previous transmission period, until a transmission period occurs when the first transmission resource is unused and the second transmission resource is used (transmission period 2 in FIG. 10). In other words, the timing of the first resource is moved earlier and earlier in time in each subsequent transmission period, until the transmission phase lies between the first and the second allocation. Optionally, the timing of the second resource may also be adjusted in each transmission period, advantageously in the same way as the first resource is adjusted. This corresponds to moving the entire "allocation pair" earlier in time. Optionally, the estimation may be stopped when a transmission period occurs when the second transmission resource is used. The transmission phase is then estimated to be between the timing of the first transmission resource and the timing of the second transmission resource. However, it is also possible to continue the estimation process to obtain a more accurate result, by proceeding to the next bullet below.

When the second transmission resource was used in the previous transmission period (arrow "B used" in FIG. 11 and transmission period 2 in FIG. 10), allocate the second uplink transmission resource in the subsequent transmission period (transmission period 3 in FIG. 3) such that it occurs less than a transmission period length after the second uplink transmission resource allocated in the previous transmission period, until a transmission period occurs when the second transmission resource is not used (arrow "Neither A nor B used" in FIG. 11, and transmission period 4 in FIG. 10). In other words, the timing of the second resource is moved earlier and earlier in time in each subsequent transmission period, until the transmission phase lies after the second allocation. At this point, the estimation may be stopped and the transmission phase may be estimated to be somewhere between the timing of the first occurrence of the second transmission resource that was not used, and the timing of the last occurrence of the second transmission resource that was used.

The radio access node then proactively allocates 604 uplink transmission resources to the wireless device, such that the timing of the proactively allocated resources matches the estimated transmission phase, in a similar way as described in connection with method 70 above.

Another embodiment will now be described, which is a variant of method 90 above. This embodiment differs from method 90 in that the second uplink transmission resource is not always allocated. More specifically, the radio access node allocates a second uplink transmission resource in a transmission period upon detecting that the first uplink transmission resource in that transmission period was not used. Conversely, the radio access node refrains from allocating a second uplink transmission period upon detecting that the first uplink transmission in that transmission period was used.

If the time interval between the first and second transmission resources in that transmission period is shorter than the time interval between an uplink grant and the corresponding allocated resource, the radio access node will not be able to detect whether the first resource was used in time to decide whether to allocate the second resource or not. Hence, when the method 90 has progressed to a point when the second resource has been moved "closer and closer" to the first resource, and the distance between the resources is shorter than this time interval, then both the first and second resources are allocated.

Figure 13:
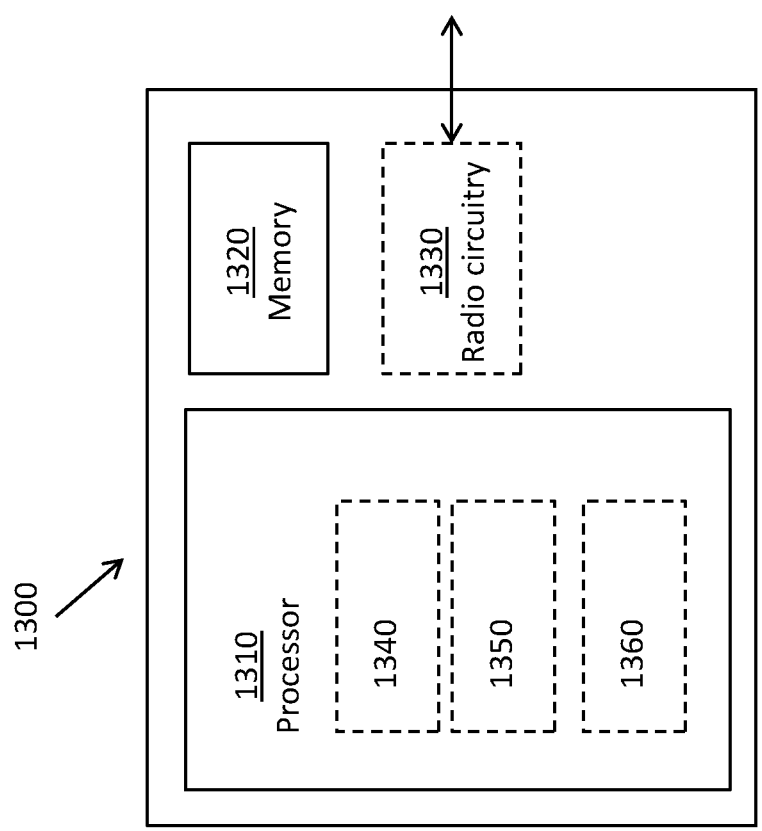
FIG. 13 is a block diagram illustrating an example radio access node.

A further embodiment will now be described with reference to FIG. 13. A radio access node 1300 is provided comprising a processor 1310 and a memory 1320. The memory contains instructions executable by the processor 1310 whereby the radio access node 1300 is operative to estimate a transmission phase for periodic uplink data traffic received from a wireless device by, for two or more transmission periods, adjusting the timing of an uplink transmission resource allocation for the wireless device in a subsequent transmission period depending on whether an uplink transmission resource allocated in a previous transmission period was used by the wireless device or not. Further, the radio access node 1300 is operative to proactively allocate uplink transmission resources to the wireless device, such that the timing of the proactively allocated resources matches the estimated transmission phase.

In an example implementation of radio access node 1300, the processor 1310 may be constituted by any suitable Central Processing Unit, CPU, microcontroller, Digital Signal Processor, DSP, etc. capable of executing computer program code such as the executable instructions referred to in the previous paragraph. The computer program may be stored in the memory 1320. The memory 1320 can be any combination of a Random access memory, RAM, and a Read Only Memory, ROM. The memory 1320 may comprise persistent storage, which, for example, can be any single one or combination of magnetic memory, optical memory, or solid state memory or even remotely mounted memory.

The radio access node 1300 may further comprise radio circuitry 1330 adapted to communicate using one or more radio access technologies (e.g. LTE, UTRAN, WLAN, Bluethooth). The radio circuitry 1330 may further be associated with one or more antennas over which radio signals may be transmitted.

In some implementations of the radio access node 1300, the processor 1300 comprises an estimation unit 1340, an adjusting unit 1350 and an allocation unit 1360. The estimation unit 1340 is configured to estimate a transmission phase for periodic uplink data traffic received from a wireless device by means of the adjusting unit 1350. The adjusting unit 1350 is configured to adjusting the timing of an uplink transmission resource allocation for the wireless device in a subsequent transmission period depending on whether an uplink transmission resource allocated in a previous transmission period was used by the wireless device or not. The allocation unit 1360 is configured to proactively allocate uplink transmission resources to the wireless device, such that the timing of the proactively allocated resources matches the estimated transmission phase.

In one embodiment, the disclosure relates to the above mentioned computer program, comprising computer readable code which, when run on an wireless device, causes the node to perform any of the aspects of the method described above.

Figure 12:
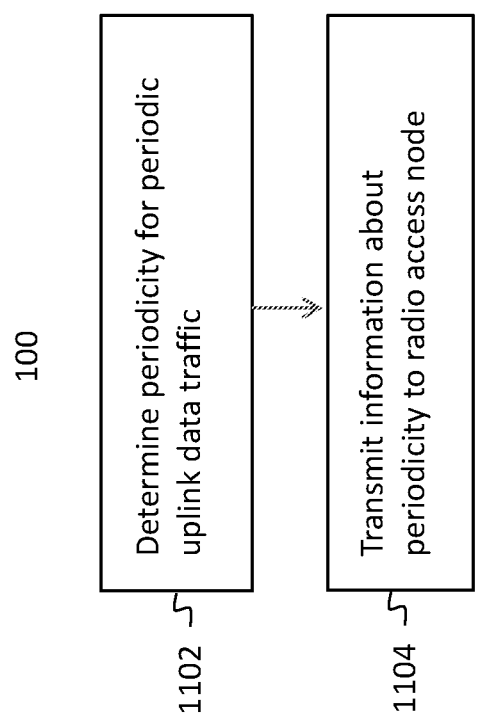
FIG. 12 is a flow chart illustrating a method in a wireless device.

With reference to the flow chart in FIG. 12, a method 120 in a wireless device will now be described. The wireless device is configured for periodic uplink data traffic as has been described above.

According to the method, the wireless device determines 1202 a periodicity for the periodic uplink data traffic. The periodicity may be determined by monitoring incoming data traffic during a certain time frame to check for a periodic pattern.

Further, the wireless device transmits 1204 information about the periodicity to a radio access node.

Figure 14:
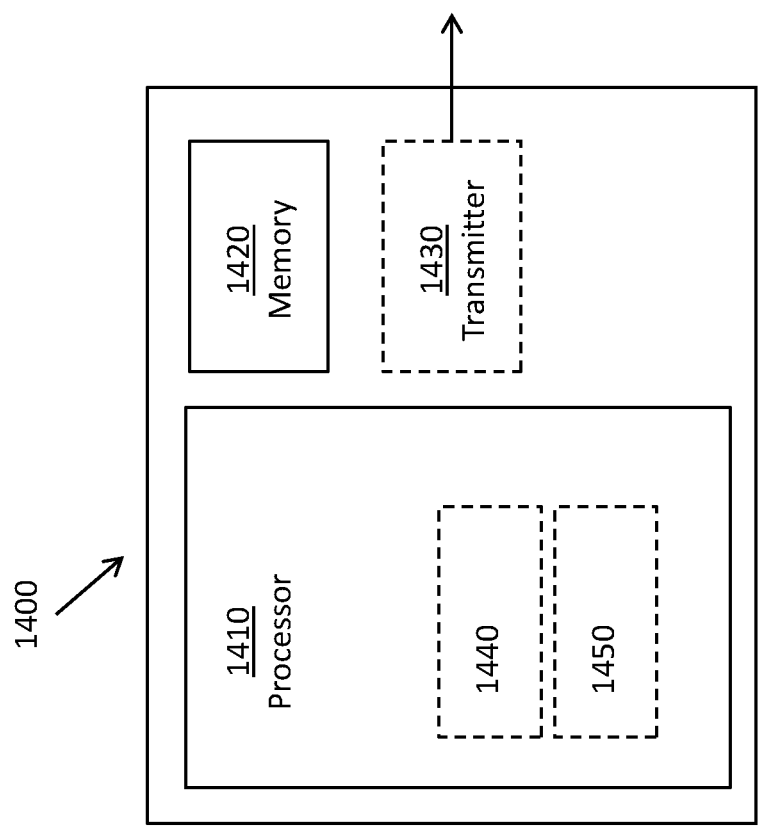
FIG. 14 is a block diagram illustrating an example wireless device.

A further embodiment will now be described with reference to FIG. 14. A wireless device 1400 is provided comprising a processor 1410, a memory 1420, and a transmitter 1430, said memory 1420 containing instructions executable by the processor 1410 whereby the wireless device 1400 is operative to determine a periodicity for the periodic data traffic, and transmit information about the periodicity via the transmitter 1430 to a radio access node.

In an example implementation of wireless device 1400, the processor 1410 may be constituted by any suitable Central Processing Unit, CPU, microcontroller, Digital Signal Processor, DSP, etc. capable of executing computer program code such as the executable instructions referred to in the previous paragraph. The computer program may be stored in the memory 1420. The memory 1420 can be any combination of a Random access memory, RAM, and a Read Only Memory, ROM. The memory 1420 may comprise persistent storage, which, for example, can be any single one or combination of magnetic memory, optical memory, or solid state memory or even remotely mounted memory.

The transmitter 1430 may be adapted to communicate using one or more radio access technologies (e.g. LTE, UTRAN, WLAN, Bluethooth). The radio circuitry 1330 may further be associated with one or more antennas over which radio signals may be transmitted.

In some implementations of the radio access node 1300, the processor 1300 comprises an determining unit 1340 and a transmitting unit 1350. The determining unit 1340 is configured to determine a periodicity for the periodic data traffic. The transmitting unit 1350 is configured to transmit information about the periodicity via the transmitter to a radio access node.

In one embodiment, the disclosure relates to the above mentioned computer program, comprising computer readable code which, when run on an wireless device, causes the node to perform any of the aspects of the method described above.

In some of the above examples, it has been assumed that the periodicity, packet size etc. of the transmission is already known. For the sake of completeness, different methods for obtaining this information will now be described.

Periodicity (i.e. the period) may be learnt from observing and averaging the time period over several transmissions. The packet size may be learnt in the same manner. The period of the transmissions may be quickly learnt by proactively allocating a series of very frequent (e.g. every subframe) transmission resources and observing which one(s) the UE uses. MCS and subcarrier frequency may be learnt from experience of preceding transmissions, combined with knowledge or observation of UE non-mobility, or through the use of Sounding Reference Signals with a periodicity that matches the periodicity of the UL user data transmissions.

For most relevant scenarios, use of SPS is a resource efficient means for realizing the feature (FIG. 3, case c).

The period of packet arrivals to the UE buffer can be estimated as the ratio of the number of transmitted packets to the observed transmission time interval. The same way the expected packet size can be calculated as the ratio of the total amount of transmitted data to the number of transmitted packets or by simply observing the amount of data that is transmitted in a sequence without an intermediate BSR indicating empty transmission buffer.

It is also conceivable that the transmission period and/or the packet size may be retrieved from another source, such as the subscriber data or information from a Services Capability Server (SCS). Subscriber data is downloaded from the HSS to the MME when the UE registers in the MME and if information from the subscriber data is to be used for this purpose, the MME may forward this information to the eNB, e.g. in the S1AP message Initial Context Setup Request.

Another possibility is to derive the packet size from the service being used, based on the fact that many services, such as VoLTE and certain video stream applications, etc., generates fixed size packets. With this method the packet size information may originate from the PCRF, which in turn may derive it from service related information received from an application server in conjunction with service initiation. The PCRF would transfer the packet size information to the PGW when informing it of the QoS (among other things) of the new user plane flow. The PGW would forward the information to the SGW in the Create Bearer Request GTPv2-C message (or possibly the Update Bearer Request GTPv2-C message), which in turn would forward the information to the MME using the same type of message. The MME may further forward the information to the eNB in the S1AP message E-RAB Setup Request (or possibly E-RAB Modify Request). This packet size information could be added as a new explicit parameter in the involved messages, either standardized or in proprietary private extensions. Another way could be to associate different packet sizes with different QCI values, selected from the currently unreserved QCI values, i.e. values 10-255, possibly combined with various suitable QoS related parameters (similar to the way the reserved QCI values are specified). The latter alternative may be preferable, because it does not require any new message parameters—only configuration efforts—since the QCI is already included in all the involved messages.

Utilizing Deep Packet Inspection (DPI) to detect the packet size could also be a possible option. In such a case, using the typically existing DPI mechanism in the PGW would seem natural. The detected packet size information could be conveyed to the MME and the eNB in the same way as when the information originates from the PCRF, as described above. DPI could also be applied in an entity above the SGi interface, e.g. a entity identifying services and/or manipulating traffic data flows. In such a case the protocols developed for Smart Mobile Broadband features may be used to convey the information to the eNB.

Yet another possibility is that the UE sends information about transmission periodicity and/or packet size to the network, e.g. in the RRCConnectionSetupComplete message or as a MAC Control Element (e.g. in the MAC PDU carrying the RRCConnectionSetupComplete message) to the eNB or in a NAS message, e.g. the Attach Request message, to the MME (in which case the MME would forward the information to the eNB, e.g. in the S1AP message Initial Context Setup Request) or in the RRC message UECapabilityInformation.

If the packet size is unknown or not reliably predictable, then a way to ensure low access delay for the transmission of a packet could be to use proactive frequent allocations, until a BSR is received that indicates that the transmission buffer in the UE is empty. That is, instead of a single proactive allocation at an expected transmission occasion the eNB schedules a suite of proactive allocations, potentially as frequently as every subframe, and continues to do so until a BSR indicating empty transmission buffer in the UE is received (or until the eNB, in the absence of received uplink transmissions from the UE, determines that no data at all will be transmitted during this expected transmission occasion). A straightforward, but less flexible alternative method could be to simply allocate an excessively large transmission resource at once.

A possible expansion of the above concept is to target not only "simple" periodic transmissions, but also more complex traffic patterns, still with the prerequisite that the traffic pattern is repeated periodically. To this end the network, mainly the RBS, could learn such periodic traffic patterns, including not only its periodicity and phase (and packet sizes and suitable MCS), but also the "internal structure" of the transmissions during one transmission period, i.e. the pattern.

The word "comprise" or "comprising" as used throughout this disclosure is intended to be interpreted as non-limiting, i.e. meaning "consist at least of".

The present invention is not limited to the embodiments described above. Various alternatives, modifications and equivalents will come to mind when reading the present disclosure. Therefore, the above embodiments should not be taken as limiting the scope of the invention, which is defined by the appending claims.

The invention claimed is:

1. A method for proactive allocation of uplink transmission resources to a wireless device, wherein the wireless device transmits periodic uplink data traffic, the method being performed in a radio access node in a wireless communication system, the method comprising:
   estimating a transmission phase for the periodic uplink data traffic by, for two or more transmission periods, adjusting timing of an uplink transmission resource allocation for the wireless device in a subsequent transmission period depending on whether an uplink transmission resource allocated in a previous transmission period was used by the wireless device or not; and proactively allocating uplink transmission resources to the wireless device, such that a timing of the proactively allocated uplink transmission resources matches the estimated transmission phase, wherein estimating the transmission phase further comprises allocating a first and second uplink transmission resource in each transmission period, and adjusting a timing of the first and/or the second uplink transmission resource allocation depending on which of the uplink transmission resources allocated in a previous transmission period was used by the wireless device.

2. The method of claim 1, wherein the adjusting further comprises allocating an uplink transmission resource in the subsequent transmission period such that it occurs less than a transmission period length after the uplink transmission resource allocated in the previous transmission period when the resource allocated in the previous transmission period was used by the wireless device, until a transmission period occurs when the allocated uplink transmission resource is not used by the wireless device.

3. The method of claim 1, further comprising allocating a second uplink transmission resource in a transmission period upon detecting that the first uplink transmission resource in that transmission period was not used, and refraining from allocating a second uplink transmission period upon detecting that the first uplink transmission in that transmission period was used.

4. The method of claim 3, wherein the adjusting further comprises: when the first transmission resource was used and no second transmission resource has been allocated, allocating the first uplink transmission resource in the subsequent transmission period such that it occurs less than a transmission period length after the corresponding uplink transmission resource allocated in the previous transmission period, until a transmission period occurs when the first transmission resource is no longer used.

5. The method of claim 1, further comprising allocating a second transmission resource in a transmission period such that the time interval between the first and second transmission resources in that transmission period is shorter than the time interval between an uplink grant and the corresponding allocated resource.

6. The method of claim 1, wherein the adjusting further comprises: when the first transmission resource was used and a second transmission resource was allocated, allocating at least the first uplink transmission resource in the subsequent transmission period such that it occurs less than a transmission period length after the corresponding uplink transmission resource allocated in the previous transmission period until a transmission period occurs when the second transmission resource is used.

7. The method of claim 6, wherein the transmission phase is estimated to be between the timing of the first transmission resource and the timing of the second transmission resource.

8. The method of claim 1, wherein when the second transmission resource was used, allocating the second uplink transmission resource in the subsequent transmission period such that it occurs less than a transmission period length after the second uplink transmission resource allocated in the previous transmission period until a transmission period occurs when the second transmission resource is not used.

9. The method of claim 8, wherein the transmission phase is estimated to be between the timing of the first occurrence of the second transmission resource that was not used, and the timing of the last occurrence of the second transmission resource that was used.

10. The method of claim 1, further comprising repeating the estimation of the transmission phase and the proactive allocation upon detecting either non-use of the proactively scheduled transmission resource, or a scheduling request from the wireless device.

11. The method of claim 1, further comprising determining a modulation and coding scheme to be used by the wireless device when transmitting on the proactively allocated resources, wherein the estimation is based on a sounding reference signal received from the wireless device, and further comprising transmitting an indication of the estimated modulation and coding scheme to the wireless device.

12. The method of claim 11, further comprising configuring the wireless device to transmit sounding reference signals with the same periodicity as the uplink data traffic.

13. The method of claim 1, further comprising receiving information about the periodicity of the uplink data traffic from the wireless device.

14. The method of claim 1, wherein the transmission resources used for estimation are allocated using semi-persistent scheduling.

15. A radio access node comprising:
a processor; and
a memory, said memory containing instructions executable by the processor whereby the radio access node operates to:
estimate a transmission phase for periodic uplink data traffic received from a wireless device by, for two or more transmission periods, adjusting the timing of an uplink transmission resource allocation for the wireless device in a subsequent transmission period depending on whether an uplink transmission resource allocated in a previous transmission period was used by the wireless device or not; and
proactively allocate uplink transmission resources to the wireless device, such that the timing of the proactively allocated uplink transmission resources matches the estimated transmission phase,
wherein in estimating the transmission phase, the radio access node further operates to allocate a first and second uplink transmission resource in each transmission period, and adjust a timing of the first and/or the second uplink resource allocation depending on which of the uplink transmission resources allocated in a previous transmission period was used by the wireless device.

* * * * *